Patented May 8, 1928.

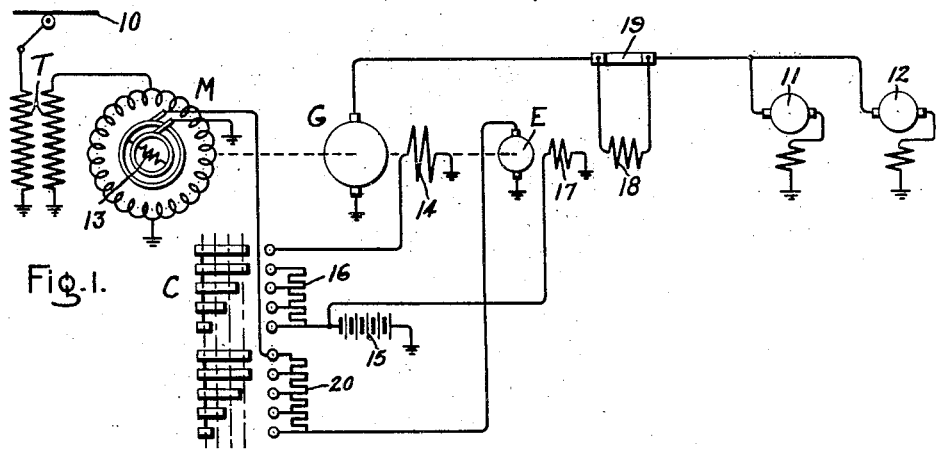
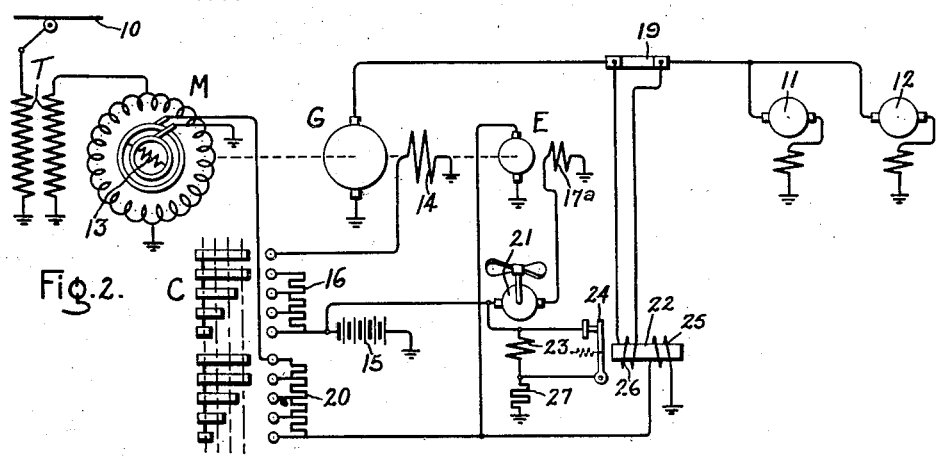
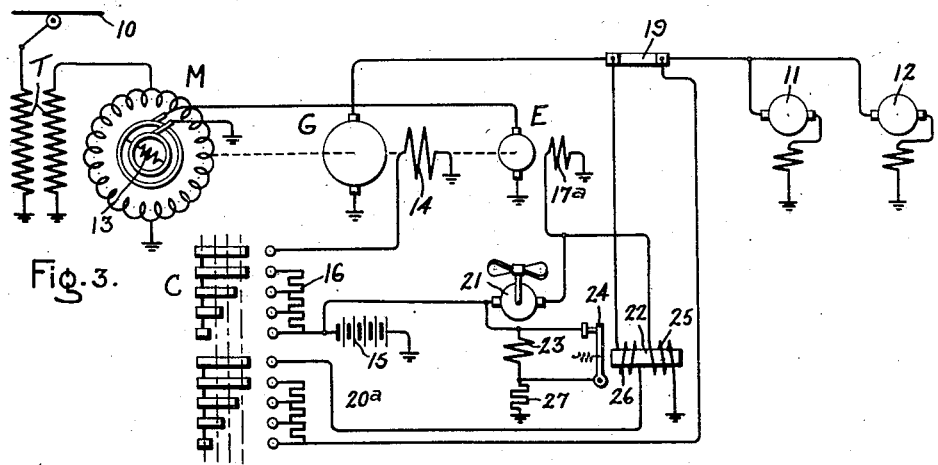

1,669,162

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

MOTOR-GENERATOR CONTROL.

Application filed November 3, 1925. Serial No. 66,621.

My invention relates to the control of motor generator sets, and it has particular relation to the control of alternating current synchronous motor-direct current generator sets employed in electric locomotive or other similar service for converting alternating current to variable voltage direct current suitable for operating direct current motors at varying speed.

In such service ordinarily it is desirable to utilize the full power capacity of the motor generator set to the greatest possible advantage. This is especially true where the motor generator set is mounted upon an electric locomotive and used to supply power from an alternating current source to direct current variable speed series traction motors, as the size of the motor generator set necessarily is limited. Where the voltage of the direct current generator is varied between wide limits in order to operate the traction motors at varying speed, the load imposed upon the alternating current synchronous motor driving the generator varies between even wider limits since the load current of the generator also varies through a wide range under varying operating conditions. Consequently, unless the synchronous motor is disproportionately large, the field of excitaton of the synchronous motor must be varied through a considerable range in order to maintain the power factor of the motor at a desirable value, as well as to insure that the motor does not drop out of step under heavy overload operating conditions.

It is the object of my invention to provide an improved arrangement of control apparatus and circuits whereby the field excitation of the synchronous motor may be varied automatically and approximately in accordance with the kilowatt load on the direct current generator.

In carrying my invention into effect in a preferred form, I provide a controller for regulating the voltage of the direct current generator and I arrange to control the excitation of the field winding of the synchronous motor responsively to operation of the voltage regulating controller, as well as responsively to the value of the load current of the direct current generator. In this way the excitation of the synchronous motor is varied substantially in accordance with the kilowatt output of the direct current generator and the motor power factor and torque are maintained at suitable values.

The accompanying drawing illustrates several embodiments of my invention. Fig. 1 is a circuit diagram showing a control system for a motor generator set employed in electric locomotive service in which the excitation of the synchronous alternating current motor is controlled responsively to both the voltage and the current of the direct current generator; Figs. 2 and 3 show modifications of the control system illustrated in Fig. 1.

As shown diagrammatically in Fig. 1 the electric locomotive is provided with a motor generator set MG comprising the synchronous alternating current motor M and the direct current generator G. The motor M is arranged to receive power through the voltage reducing transformer T from the high voltage alternating current supply line 10 and the generator G supplies variable voltage direct current to the series traction motors 11 and 12. The exciter E, which may be driven from the shaft of the motor generator set, is connected to supply energizing current to the field winding 13 of the synchronous motor, while the field winding 14 of the direct current generator G is energized from a suitable constant voltage source such as the battery 15. The exciting current of the generator field winding 14 and consequently the voltage of the generator is varied by means of the resistor 16 which is under the control of a suitable controller C. The controller C may be operated manually or in any other well known manner.

The exciter E of the synchronous motor in the form shown in Fig. 1 is provided with two field windings 17 and 18, the winding 17 being energized from the battery 15 or other suitable constant voltage source, and the winding 18 being energized in accordance with the load current of the direct current generator G by suitable means, such as the shunt 19 indicated in the drawing. Preferably the field winding 18 is arranged to supply a major portion of the excitation of the exciter E so as to cause the voltage of the exciter, and consequently the current supplied to the synchronous motor field winding 13, to vary approximately in accordance with the current supplied by the generator G to the series traction motors 11 and 12.

In order that the excitation of the field winding of the synchronous motor M may be varied not only approximately in accordance with the current of the direct current generator G, but also substantially in accordance with the variation in the voltage of the generator G, the exciter E is connected to supply current to the field winding 13 of the synchronous motor through the regulating resistor 20 which is arranged to be varied responsively to operation of the controller C to vary the voltage of the generator G. In this way the exciting current supplied to the field winding 13 of the motor M is reduced by inserting the regulating resistor 20 in the excitation circuit when the controller C is operated to reduce the voltage of the generator G to a low value. Likewise, the synchronous motor field excitation is increased by removing successive portions of the regulating resistor 20 from the circuit as the controller C is operated to increase the voltage of the generator G. It will be understood that the regulating resistor 20 may be controlled by means of contactors which are controlled by the controller C if it is desired to operate the motor generator electric locomotive in multiple unit with other similar locomotives.

The operation of the control system illustrated in Fig. 1 is as follows: With the alternating current supply line 10 energized from a suitable alternating current source, the synchronous motor M is connected to the low voltage side of the transformer T and accelerated to synchronous speed by suitable motor starting control apparatus not shown in the drawing. With the controller C in the off position in which it is shown, the field winding 14 of the direct current generator G is deenergized and the voltage of the generator G is of negligible value. Consequently, no current is supplied to the series traction motors 11 and 12. Under these conditions only the field winding 17 of the exciter E is energized and hence the exciter supplies exciting current to the field winding 13 of the synchronous motor at relatively low voltage. The entire regulating resistor 20 is inserted in the excitation circuit and maintains the exciting current at a relatively low value which is suitable for no load operation of the synchronous motor M. Preferably the exciter voltage and the regulating resistor 20 are so proportioned that the no load exciting current of the synchronous motor M is of the value required to maintain the power factor of the synchronous motor near unity or slightly leading, thereby producing the most efficient and advantageous operating conditions for the motor as well as the alternating current supply circuit.

In order to supply current to the series traction motors 11 and 12 to start the electric locomotive, the controller C is moved into its first operative position. This connects the field winding 14 of generator G to the battery 15 through the entire resistance 16. Since the exciting current of the generator field winding is at a minimum value the generator G supplies current to the traction motors at relatively low voltage. As the motors 11 and 12 start and accelerate the locomotive to a speed dependent upon the voltage of the generator G, the field winding 18 of the exciter E is energized in accordance with the load current of the direct current generator and serves to automatically increase the voltage of the exciter E in proportion to the load imposed upon the synchronous motor M. The resulting increase in the exciting current of the synchronous motor field winding 13 maintains the power factor of the motor substantially constant at unity or other desired value.

When the controller C is operated to increase the voltage of the direct current generator G by short circuiting a portion of the resistance 16, it will be observed that at the same time a corresponding portion of the regulating resistor 20 is removed from the excitation circuit of the field winding of synchronous motor M. This results in further increasing the excitation of the synchronous motor. By properly designing the regulating resistor 20 and the exciter E the excitation of the synchronous motor is varied approximately in accordance with the kilowatt output of the generator G, the field winding 18 of exciter E serving to vary the voltage of the exciter respon ively to variations in the load current of generator G and the regulating resistor 20 serving to vary the exciting current in accordance with the voltage of the generator G.

When successive portions of the regulating resistor 20 are removed from the exciting circuit of the synchronous motor field winding 12 as the controller C is operated to increase the voltage of the generator G and thereby increase the speed at which the traction motors 11 and 12 drive the locomotive, the exciting current of the synchronous motor field winding is increased correspondingly. The load current of the generator G, however, depends not only upon the voltage of the generator, but primarily upon the draw bar pull of the locomotive, which obviously varies with the track grade, as well as the weight of the train drawn by the locomotive. In case the locomotive is operating upon an ascending grade, generator G may be required to supply a large value of current at relatively low voltage to the traction motors 11 and 12. In running at high speed on a descending grade or on a level track, the voltage of the generator may be at a maximum value and the current at a relatively low value. However, under these varying conditions of service the excitation of the synchronous motor field winding 13 automatically is varied substantially in accordance with the kilowatt load of the generator G. Thus the power factor of the synchronous motor always is maintained at the desired value, the torque of the motor always is well above the break down point, and the synchronous motor is operated under the most efficient and advantageous conditions.

In the modified arrangement shown in Fig. 2, the exciter E for the field winding of the synchronous motor M is of the ordinary type having only a single field winding 17$^a$. The voltage of the exciter E is regulated by means of a counter E. M. F. motor 21 and a cooperating regulator 22 for the field winding 23 of the counter E. M. F. motor. In this arrangement the armature of the counter E. M. F. motor 21 is connected in the circuit through which the exciter field winding 17$^a$ receives current from the constant voltage battery 15. The regulator 22 is of the type having a vibrating contact member 24 under the joint control of the operating windings 25 and 26, the former being excited responsively to the voltage of the exciter E and the latter responsively to the load current of the generator G. The operating windings 25 and 26, as indicated in the drawing, are wound differentially. The exciter E supplies current to the synchronous motor field winding 13 through the regulating resistor 20 which is controlled responsively to operation of the voltage regulating controller C of the generator G in the same manner as previously described in connection with Fig. 1.

In operation the regulator 22 maintains the voltage of the exciter E at a predetermined value when the generator G is unexcited and there is no current supplied to the traction motors 11 and 12. Under these conditions the vibrating contact member 24 is controlled entirely by the operating winding 25 of the regulator 22 since the operating winding 26 receives no energizing current. Consequently, the contact 24 will short circuit the field winding 23 of the counter E. M. F. motor 21 with the current limiting resistor 27 in circuit therewith when the voltage of the exciter E is below a certain value. When the field winding 23 is short circuited the counter voltage of the motor 21 falls, thus permitting an increased energization of the exciter field winding 17$^a$ from the battery 15. The resulting increase in the voltage of exciter E causes the winding 25 to operate the contact 24 so as to remove the short circuit around the field winding 23, thus permitting the counter voltage of the motor 21 to increase and thereby reduce the energizing current of the exciter E. The contact 24 vibrates rapidly in the well known manner to successively open and close the short circuit around the field winding 23 and consequently maintains the voltage of the exciter at a value sufficient to supply the desired no load exciting current to the synchronous motor M through the regulating resistor 20.

When the generator G is excited by operation of the controller C to start the electric locomotive, the operating winding 26 then is energized in accordance with the load current supplied by the generator G to the traction motors 11 and 12 through the shunt 19. The differential action of the operating winding 26 serves to increase the value at which the regulator 22 and the counter E. M. F. motor 21 maintain the voltage of the exciter E. The arrangement is such that the increase in exciter voltage is approximately proportional to the load current of the generator G. Concurrently with the variation in the exciting current of the synchronous motor field winding 13 due to variation in the voltage of the exciter E by the regulator 22, the regulating resistor 20 likewise controls the synchronous motor exciting current responsively to the operation of the controller C to vary the voltage of the direct current generator G in substantially the same manner as previously described. Thus, it will be seen that the control arrangement illustrated in Fig. 2 automatically varies the field current of the synchronous motor M so as to insure operation of the synchronous motor at unity power factor or any other desired power factor with widely varying loads on the direct current generator G. The counter E. M. F. motor 21 and the regulator 22 serve to vary the exciting current in accordance with variations in the load current of generator G and the regulating resistor 20 serves to vary the excitation in accordance with variations in the voltage of the generator. It will be evident that the combined regulating effect varies the excitation of the field winding of the synchronous motor substantially in accordance with the kilowatt output of the generator.

If it is desired to connect the armature of the exciter E directly to the field winding 13 of the synchronous motor M to avoid losses in a regulating resistor, the regulating arrangement shown in Fig. 3 may be employed. In this case the exciter E is provided with a single field winding 17$^a$ and the operating winding 25 of the regulator 22 is connected to be energized in accordance with the voltage impressed upon the exciter field winding 17$^a$. The differential winding 26 of the regulator is connected in circuit with a suitable regulating resistor 20ª. As in the arrangement previously described, the controller C regulates the voltage of the generator G by varying the field regulating resistor 16. The regulating resistor 20ª is varied responsively to operation of the controller C to vary the voltage of the generator G by suitable contacts associated with the controller C as indicated in the drawing or by contactors controlled by the controller C.

With the synchronous motor M operating and no load on the direct current generator G, the exciter E supplies a minimum value of exciting current to the field winding 13 of the synchronous motor. The vibrating contact 24 of the regulator is under the control of the operating winding 25 and controls the short circuit around the field winding 23 of the counter E. M. F. motor 21 so as to maintain the excitation of the exciter field winding 17ª at a suitable value. When the controller C is operated to energize the field winding 14 of the direct current generator G, the generator supplies operating current to the traction motors 11 and 12. The differential winding 26 of the regulator 22 thereupon is energized responsively to the load current of generator G through the shunt 19. The value of the energizing current of the differential winding 26 also is controlled by the regulating resistor 20ª. Since the resistor 20ª is varied in accordance with the operation of controller C to vary the voltage of the direct current generator G and the energization of the winding 26 is dependent upon the load current of the generator, the resulting differential action of the winding 26 varies in accordance with the kilowatt output of the generator G. Hence, with either a variation in the voltage or a variation in the current of the generator G, the excitation of the differential winding 26 is correspondingly varied and the resulting operation of the regulator 22 and counter E. M. F. motor 21 correspondingly varies the excitation of the exciter field winding 17ª. In this way, the current supplied by the exciter E to the field winding 13 of the synchronous motor is caused to vary substantially in accordance with the kilowatt load on the direct current generator G.

While I have illustrated and described my invention embodied in electric locomotive motor generator control systems, I would have it understood that the invention is not necessarily limited thereto and may be employed with equal advantage in other service. Furthermore, various modifications may be made in the control apparatus illustrated and described without departing from the spirit of the invention or from the scope of the appended claims.

What I claim as new and desire to secure by Letters Patent of the United States, is:

1. The combination with a motor generator set comprising an alternating current synchronous motor and a direct current generator, of an exciter for exciting the field winding of the synchronous motor, means for regulating the voltage of the direct current generator, and means jointly responsive to operation of said voltage regulating means and to the current of the direct current generator for regulating the current supplied by the exciter to the field winding of the synchronous motor substantially in accordance with the watt output of the generator.

2. The combination with a motor generator set comprising an alternating current synchronous motor and a direct current generator, means operable to vary the voltage of the direct current generator between a plurality of predetermined values, an exciter arranged to be automatically controlled for exciting the field winding of the synchronous motor substantially in accordance with the load current of the direct current generator, and means for varying the exciting current of the synchronous motor substantially in accordance with the value of the voltage of the direct current generator.

3. The combination with a motor generator set comprising an alternating current synchronous motor and a direct current generator, of an exciter for exciting the field winding of the synchronous motor, a controller for varying the voltage of the direct current generator between a plurality of predetermined values, means responsive to the current of the direct current generator for automatically controlling said exciter to vary the excitation of the synchronous motor field in accordance with the variations of the current of the generator and means cooperating with said exciter under the control of said controller for regulating the current supplied by the exciter to the field winding of the synchronous motor in accordance with the voltage of the generator.

4. The combination with a motor generator set comprising an alternating current synchronous motor and a direct current generator of means for controlling the voltage of the direct current generator, a separately excited exciter automatically controlled for exciting the field winding of the synchronous motor substantially in accordance with the load current of the direct current generator, and means controlled by said voltage controlling means and arranged to vary the excitation of the separately excited exciter upon a variation in the voltage of the direct current generator.

5. The combination with a motor generator set comprising an alternating current synchronous motor and a direct current generator, or a separately excited exciter normally arranged to supply a predetermined excitation to the field winding of the synchronous motor, means for regulating the voltage of the direct current generator, means responsive to the load current of the generator for automatically controlling the excitation of the exciter in accordance therewith, and means responsive to operation of said voltage controlling means for controlling the excitation of the exciter concurrently with said current responsive means.

6. The combination with a motor generator set comprising an alternating current synchronous motor and a variable voltage direct current generator, of an exciter for the field winding of the synchronous motor, and cooperating means operable jointly in accordance with the values of the voltage and the current of the direct current generator for varying the exciting current supplied to the synchronous motor field winding by said exciter substantially in accordance with the watt output of the direct current generator.

7. The combination with a motor generator set comprising an alternating current synchronous motor and a direct current generator, of a controller for varying the voltage of the direct current generator, a separately excited exciter for the field winding of the synchronous motor, automatic means for controlling the excitation of the exciter to vary the exciting current supplied by said exciter to the field winding of the synchronous motor substantially in accordance with the load current of the direct current generator, and a resistor under the control of said controller, and cooperating with said automatic means for varying the exciting current supplied by said exciter to the field winding of the synchronous motor substantially in accordance with variations in the voltage of the direct current generator.

8. The combination with a motor generator set comprising an alternating current synchronous motor and a direct current generator, of a controller for varying the voltage of the direct current generator, an exciter for the field winding of the synchronous motor, automatic means for varying the voltage of said exciter responsively to variations in the load current of the generator, and means under the control of said controller for controlling the exciting current supplied by said exciter in accordance with the variations in the voltage of the direct current generator.

9. The combination with a motor generator set comprising an alternating current synchronous motor and a direct current generator, of means for regulating the voltage of the direct current generator, an exciter for exciting the field winding of the synchronous motor, means for separately exciting the exciter, automatic means for regulating the excitation of the exciter substantially in accordance with the load current of the direct current generator and a resistor connected in the exciting circuit for the synchronous motor field winding and arranged to be controlled by said voltage regulating means to vary the excitation of the synchronous motor upon a variation in the voltage of the direct current generator.

10. The combination with a motor generator set comprising an alternating current synchronous motor and a direct current generator, of a controller for regulating the voltage of the direct current generator, an exciter for the field winding of the synchronous motor, said exciter having a field winding energized in accordance with the load current of the direct current generator, and resistance controlled by said controller and connected in the exciting circuit of the synchronous motor field winding for varying the excitation thereof substantially in accordance with the voltage of the direct current generator.

In witness whereof, I have hereunto set my hand his twentieth day October, 1925.

PETER W. FORSBERG.